PAUL J. ERNISSE
INVENTOR.

ATTORNEYS

United States Patent Office 3,363,526
Patented Jan. 16, 1968

3,363,526
FLASH PHOTOGRAPHY
Paul J. Ernisse, Rochester, N.Y., assignor to Eastman Kodak Company, Rochester, N.Y., a corporation of New York
Continuation-in-part of application Ser. No. 458,015, May 24, 1965. This application July 12, 1965, Ser. No. 471,179
7 Claims. (Cl. 95—11.5)

ABSTRACT OF THE DISCLOSURE

A photographic camera to make an exposure and having a rotatable socket to receive a multilamp photoflash package, the improvement of means operable during exposure to rotate the socket and received package to provide a sweep flash from the flashlamp in the circuit.

---

This application is a continuation-in-part of U.S. application Ser. No. 458,015, filed May 24, 1965, by Paul J. Ernisse and Michael S. Montalto. The invention relates to flash photography and more particularly, to photographic still cameras with built-in photoflash systems for accepting multilamp photoflash packages.

There has been developed a disposable multilamp photoflash unit or package having a plurality of photoflash lamps and disclosed, for example, in U.S. applications Ser. No. 417,914, now Patent No. 3,327,105, and Ser. No. 417,913, both filed Dec. 14, 1964. Application Ser. No. 458,015 describes a photographic still camera having a socket for accepting such a multilamp package and a mechanism for automatically indexing the package to successively place fresh or unfired lamps in the camera flash circuit with successive operations of the camera. This invention comprises a photographic device or camera having a socket to receive a lamp package and to rotate the socket and lamp package during camera operation and firing of the lamp in the circuit to provide a sweep flash while the exposure is being made. As such, a preferred embodiment of my invention comprises a modification of the invention described in U.S. application Ser. No. 458,015.

An important object of the present invention resides, therefore, in the provision of a new and improved photographic device designed to accept and rotate a photoflash lamp during camera operation to provide a sweep flash.

Still another object of the present invention resides in the provision of a multilamp package and receiving socket drive mechanism in a camera which operates while an exposure is being made to rotate the package and provide a sweep of light from the flash lamp in the photoflash circuit.

These and other objects and advantages will become more apparent in the course of the following description, the accompanying drawing forming a part thereof and wherein.

Figure 1:
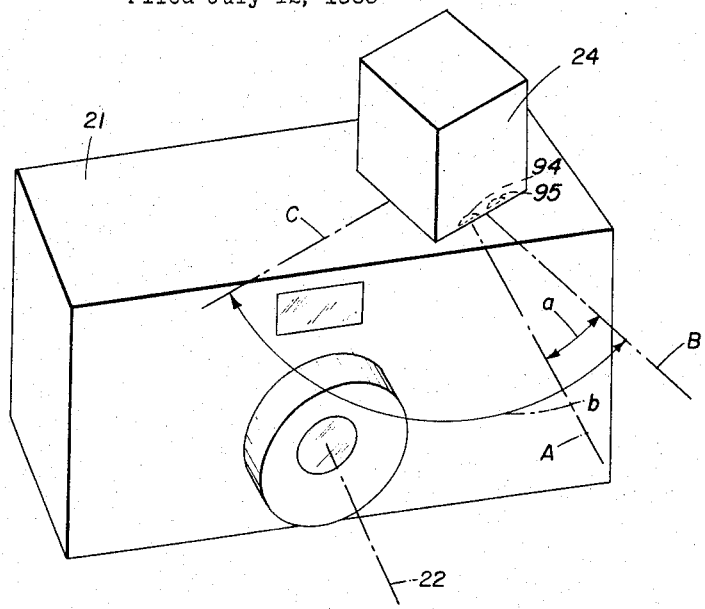
FIG. 1 is a perspective view of a photographic still camera embodying the present invention, together with a suitable multilamp photoflash package.

With reference to FIG. 1, there is shown a photographic roll film still camera comprising a light tight camera body 21 having a picture-taking or lens axis 22 on which are located the usual focusing lens and film plane for holding a frame of a roll of photosensitive film (not shown). The shutter mechanism and diaphragm are also positioned to be in operative relationship with the axis 22 to expose to frame of film located at the film plane.

Accessibly located at the top wall of the camera body 21 is a multilamp photoflash package receiving socket 23 (FIG. 2) designed to receive a disposable, multilamp photoflash unit or package 24. The package 24 is more fully described in the above listed U.S. applications. Briefly, however, the package 24 includes a plurality (four) of photoflash lamps (AG-type) ordinately mounted in a vertical position about a vertical axis of rotation on a substantially square base, with the pair of lead-in wires of each lamp extending below the base for engagement with terminals of a photoflash circuit. Individual light reflective surfaces (reflectors) are positioned behind each lamp and an overall light transmitting protective cover is provided. The base defines four lamp sides and includes a depending center post with four engagement or retaining lugs, each extending radially outwardly toward a respective lamp side. The socket 23 defines an opening, corresponding to the cross-sectional shape of the post and lugs for receiving the package 24 in any one of four predetermined positions.

Except as otherwise described herein, the camera mechanism described in U.S. application Ser. No. 458,015 may be used. Accordingly, there may be provided an accessible film winding lever which also sets the camera shutter operating mechanism to be released when operating the camera by an accessible body release member 31 (FIG. 2).

Referring again to FIG. 1, there is shown an axis A, located at the package socket, which is parallel to the camera axis 22. According to the present invention, the one lamp of the package which is in the flash circuit by engagement with circuit terminals 94, 95 on the camera faces in the direction of an axis B, designated as angle $a$, suitably 15 to 30 degrees from axis A. During camera operation, or while the shutter is open to admit light for film exposure, the package is rotated through angle $b$ until the lamp in the circuit is positioned in the direction of axis C, or ninety degrees from axis B.

Figure 2:
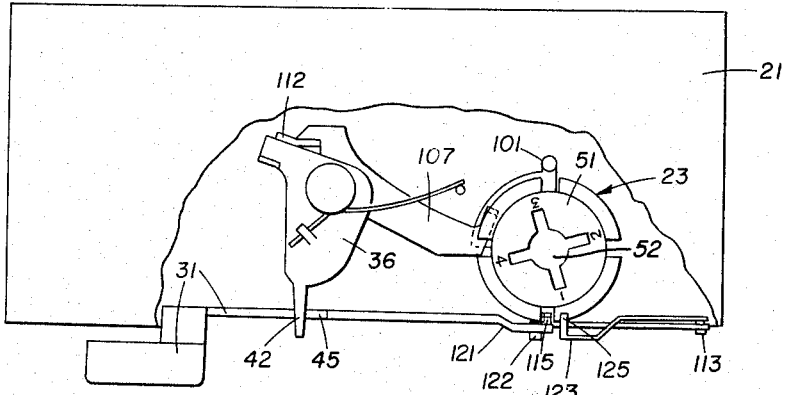
FIG. 2 is a top view showing elements of the present invention together with associated camera elements.

Referring now to FIG. 2, a suitable shutter mechanism as described in application Ser. No. 458,015 comprises a shutter striking plate or driver 36 which is rotatable about a pivot pin to strike a shutter blade. An upstanding lug 38 on the striking plate 36 is engaged whenever the camera winding lever is operated to move the plate 36 clockwise (looking down) against the bias of a strong spring to the position shown in FIG. 2, and a latch 45 on the body release 31 is normally in the path of movement of finger 42 to prevent shutter operation until the body release 31 is depressed. Upon release of the cocked striking plate 36 by depressing the body release 31, finger 42 is moved rapidly to the right (FIG. 2), to move the camera shutter blade off the exposure aperture for a predetermined period of time.

The package receiving socket 23 comprises a hollow socket cover 51 defining the upper access opening 52 for receiving the lamp package with one lamp at the position, represented by the numeral 1, on the axis B. As described in application Ser. No. 458,015, retaining springs releasably hold the attached package on the socket assembly, and attachment of the package may be used to adjust the camera mechanism for flash operation.

According to the present invention, the package-receiving socket assembly 23 (and inserted multilamp package 24) is automatically rotated during an exposure to provide a wide angle of emitted light from the lamp by which to augment scene light. In the embodiment shown the spring drive mechanism described in application Ser. No. 458,015 may be provided to achieve this result. The drive spring mechanism is energized as film is wound and the shutter cocked or set, and during exposure, the drive mechanism acts to automatically rotate the socket 23 ninety degrees until the lamp in the circuit moves from axis B to axis C.

Figures 3, 4:
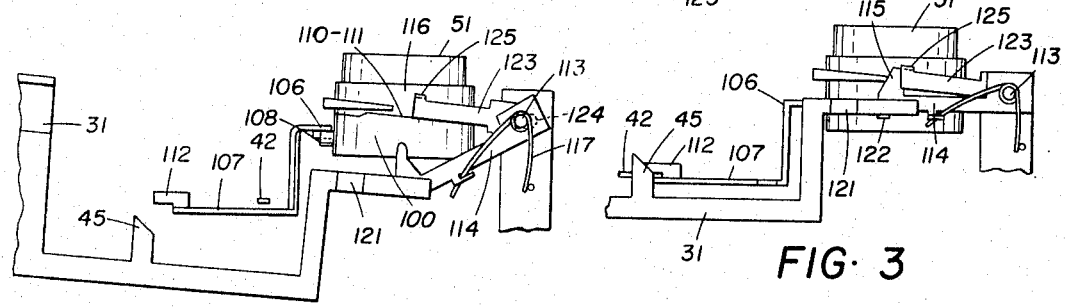
FIGS. 3 and 4 are front views showing two stages of operation of the invention.

As a part of the spring drive mechanism, the rotatable socket driving ring 100 shown in FIG. 4 is positioned below the package socket 23 shown in FIG. 3. Ring 100 includes fixed vertical winding pin 101 which is engaged during film wind to energize the drive mechanism by rotating ring 100 against the bias of a drive spring to the positions shown in FIG. 3. In this position a latch tab 106 on a lever 107, rotatable coaxially with the striking plate 36, engages a wedge shaped latch shirt 108 on the periphery of ring 100. This rotation is against the bias of the drive spring, and the drive spring thus tends to rotate the ring 100 in the clockwise direction (FIG. 2).

At the top surface of the driving ring 100 are defined a plurality (four) of clutch teeth 110 engageable with corresponding teeth 111 on the bottom surface of the socket cover 51. The cooperating teeth 110, 111 operate to rotate the socket assembly 23 clockwise with ring 100 by the drive spring, whereas ring 100 is permitted to be rotated counterclockwise during film wind without simultaneous rotation of the socket. When the ring 100 has been rotated counterclockwise to its energized position with tab 106 engaging shirt 108, a stop plate 112 on the lever 107 is engaged by the striking plate 36 to maintain tab 106 stationary and prevent return rotation of the ring 100 until commencement of camera operation as described.

To ensure proper positioning of the socket assembly 23 during indexing, there is provided a socket indexing lever 114 (pivotable about pin 113) having an indexing tab 115 insertable into a selected one of four notches 116 equally spaced on the periphery of the socket base 53. A wire spring 117 urges the lever 114 into a notch 116.

As stated, shutter operation is controlled by a release latch 45 on the body release member 31. When the striking plate 36 then moves to strike the shutter blade, lever 107 is permitted to rotate by urging of the drive spring. The socket is thus released and rotated until stopped in the manner described. As the body release member 31 is being depressed, an actuating extension 121 on the body release member acts as a disabling means by engaging ear 122 on the indexing lever 114 to pivot the lever 114 down against the bias of spring 117 and thereby move tab 115 out of engagement with the forward notch 116.

There is also provided a separate stop arm 123 which is pivotable coaxially with the indexing lever 114 on pivot pin 113. Arm 123 defines an elongated slot 124 which also enables the arm to slide laterally. Army 123 further includes a stop end 125 engageable with the notches 116, and a spring is provided to bias the arm 123 to the right as seen in FIG. 3.

As shown, the upper edge trailing each notch 116 is tapered to permit stop end 125 of arm 123 to drop into the next succeeding notch 116 as the socket assembly 23 is being rotated. Thus, arm 123 ensures that rotation of the socket assembly 23 during camera operation will be terminated when the lamp in the circuit has moved to axis C.

*Camera operation*

To operate the photographic camera according to the preferred embodiment with photoflash from a multilamp package, the base of a multilamp flash package is placed in the socket assembly 23 with a fresh photoflash lamp facing forwardly in the direction of axis B with the lead-in wires of the lamp engaging exposed flash circuit terminals of a flash synchronizing circuit. This position is indicated by the numeral 1 in FIG. 2.

Assuming the camera to be otherwise ready for operation, a flash picture is taken by aiming the camera in the desired direction and depressing the body release member 31 in the direction downwardly to its fully depressed position (FIG. 4). This motion initially releases the finger 42 of the cocked striking plate 36, which rapidly strikes the shutter to cause the shutter blade to uncap the diaphragm aperture according to the predetermined time. Simultaneously, the flash circuit synchronizing switch is closed to complete the flash circuit and fire the lamp in the circuit by igniting the combustible material within the lamp.

As the body release member 31 is being depressed, extension 121 engaging ear 122 of the indexing lever 114 moves the indexing lever 114 down to clear tab 115 from the forward notch 116 of the socket assembly 23. While the release member 31 is fully depressed and the striking plate 36 is moved from its cocked position the latch lever 107 is released, permitting the driving ring 100 and socket assembly 23 to be rotated in the clockwise direction as shown by the arrow (FIG. 2) while the shutter is open. As the socket assembly 23 (and inserted package) is rotating to move the position numbered 2 into the flash circuit position, the next succeeding notch 116 is engaged by the stop end 125 of arm 123, which is at far right position as shown in FIG. 4. Continuing the rotation to the full 90°, the stop arm 123 then prevents further rotation of the socket assembly 23. When the body release member is in its up position and the socket assembly fully indexed, spring 117 moves the indexing lever tab 115 into the forward notch 116, and tab 115 lifts stop end 125 out of the notch 116. Simultaneously, stop arm 123 is moved back to the right to engage the next succeeding notch during the subsequent camera operation.

Suitably, rotation of the socket to move the firing lamp from axis B to axis C is accomplished in fifteen milliseconds, whereas the shutter time is 1/40 second, or twenty five milliseconds. The shutter synchronizing switch is closed during the initial fraction of time to ignite the lamp material while the lead-in wires are engaging the circuit terminals 94, 95. The light from the burning material is then emitted according to the output characteristics of the lamp during rotation.

As this exposure is completed, the subsequent fresh flash lamp from the multilamp package is in the flash circuit and the camera is again ready for operation in the manner described. Of course, the shutter synchronizing switch is opened before the subsequent lamp is in the flash circuit. In each case, emitted light from the sweeping lamp provides a wide angle of augmenting light to provide an overall light level which is satisfactory.

While the invention has been described by reference to a preferred embodiment showing an integrated camera mechanism it is obvious that various modifications and changes in form can be resorted to without departing from the spirit of the invention or the scope of the subjoined claims.

I claim:
1. For use with a photographic camera having operating means actuable to make an exposure during a predetermined time, a flash assembly comprising:
   a socket having means to detachably receive a photoflash lamp, the socket being rotatable at least through a predetermined angle from a first position to a second position,
   terminal means to connect a received lamp into a flash circuit when the socket is in the first position to flash the lamp in timed relation with actuation of the operating means, and
   drive means responsive to the operating means to rotate the socket and flashing lamp during the predetermined exposure time from the first position to the second position to sweep the flashing lamp as the exposure is being made.
2. The camera according to claim 1 wherein the socket means detachably receives a package containing a plurality of lamps with one lamp connected into the circuit, and further comprising means to terminate socket rotation as a subsequent lamp of the package is connected to the circuit.

3. A photographic camera comprising:
operating means actuated during a predetermined time to make an exposure,
a rotatable socket to detachably receive a unitary package containing a plurality of photoflash lamps,
terminal means to connect a selected one lamp into a flash circuit to flash the lamp in timed relation with the operating means, and
drive means to rotate the socket and received package during the predetermined time to sweep the flashing lamp as the exposure is being made.

4. The camera according to claim 3 and further comprising means to terminate socket rotation as a subsequent lamp of the package is connected into the circuit.

5. The camera according to claim 3 and further comprising indexing means operatively retaining the socket in a selected one of a plurality of predetermined positions in which a corresponding lamp in the circuit is at an angle to the camera exposure axis.

6. The camera according to claim 5 and further comprising means to operatively disable the indexing means and permit socket rotation with the flashing lamp sweeping across the camera exposure axis.

7. The camera according to claim 6 and further comprising means to terminate socket rotation as the subsequent lamp is connected into the circuit.

References Cited

UNITED STATES PATENTS

| | | | |
|---|---|---|---|
| 2,357,827 | 9/1944 | Hopkins | 88—24 |
| 3,019,292 | 1/1962 | John | 95—12.5 XR |
| 3,096,025 | 7/1963 | Prochnow | 240—37 XR |
| 3,244,087 | 4/1966 | Anderson et al. | 95—11 |
| 3,263,068 | 7/1966 | Jakob | 240—1.3 |
| 3,267,272 | 8/1966 | Fischer | 240—1.3 |

NORTON ANSHER, *Primary Examiner.*

F. L. BRAUN, *Assistant Examiner.*